(12) United States Patent
Luukkainen et al.

(10) Patent No.: US 8,874,824 B2
(45) Date of Patent: Oct. 28, 2014

(54) APPARATUS AND METHOD TO SHARE HOST SYSTEM RAM WITH MASS STORAGE MEMORY RAM

(75) Inventors: Olli Luukkainen, Salo (FI); Kimmo Mylly, Ylojarvi (FI); Jani Hyvonen, Tampere (FI)

(73) Assignee: Memory Technologies, LLC, Las Vegas, NV (US)

( * ) Notice: Subject to any disclaimer, the term of this patent is extended or adjusted under 35 U.S.C. 154(b) by 407 days.

(21) Appl. No.: 12/455,763

(22) Filed: Jun. 4, 2009

(65) Prior Publication Data

US 2010/0312947 A1     Dec. 9, 2010

(51) Int. Cl.
*G06F 12/02*         (2006.01)

(52) U.S. Cl.
CPC .... *G06F 12/0246* (2013.01); *G06F 2212/7203* (2013.01); *G06F 2212/7207* (2013.01); *G06F 12/0223* (2013.01)
USPC ................................. 711/103; 711/E12.008

(58) Field of Classification Search
USPC .......................................... 711/103, E12.008
See application file for complete search history.

(56) References Cited

U.S. PATENT DOCUMENTS

| | | | |
|---|---|---|---|
| 5,809,340 A | 9/1998 | Bertone et al. | |
| 6,373,768 B2 | 4/2002 | Woo et al. | |
| 6,480,936 B1 | 11/2002 | Ban et al. | |
| 6,522,586 B2 | 2/2003 | Wong | |
| 6,785,764 B1 | 8/2004 | Roohparvar | |
| 7,233,538 B1 | 6/2007 | Wu et al. | |
| 7,395,176 B2 | 7/2008 | Chung et al. | |
| 7,450,456 B2 | 11/2008 | Jain et al. | |
| 7,571,295 B2 * | 8/2009 | Sakarda et al. | 711/165 |
| 7,697,311 B2 | 4/2010 | Fukuda et al. | |
| 7,760,569 B2 | 7/2010 | Ruf et al. | |
| 7,809,962 B2 | 10/2010 | Chang et al. | |
| 8,218,137 B2 | 7/2012 | Noh et al. | |
| 8,321,713 B2 | 11/2012 | Nobunaga | |
| 2002/0087817 A1 | 7/2002 | Tomaiuolo et al. | |
| 2002/0108014 A1 * | 8/2002 | Lasser | 711/103 |

(Continued)

FOREIGN PATENT DOCUMENTS

| | | |
|---|---|---|
| AU | 2005200855 A1 | 9/2004 |
| JP | 10228413 A | 8/1998 |

(Continued)

OTHER PUBLICATIONS

"A NAND Flash Memory Controller for SD/MMC Flash Memory Card", Chuan-Sheng Lin et al., IEEE 2007, pp. 933-935.

(Continued)

*Primary Examiner* — Yong Choe
(74) *Attorney, Agent, or Firm* — Lee & Hayes, PLLC (57) ABSTRACT

A method includes, in one non-limiting embodiment, sending a request from a mass memory storage device to a host device, the request being one to allocate memory in the host device; writing data from the mass memory storage device to allocated memory of the host device; and subsequently reading the data from the allocated memory to the mass memory storage device. The memory may be embodied as flash memory, and the data may be related to a file system stored in the flash memory. The method enables the mass memory storage device to extend its internal volatile RAM to include RAM of the host device, enabling the internal RAM to be powered off while preserving data and context stored in the internal RAM.

39 Claims, 7 Drawing Sheets

(56) References Cited

U.S. PATENT DOCUMENTS

| | | | |
|---|---|---|---|
| 2003/0137860 A1* | 7/2003 | Khatri et al. | 365/63 |
| 2004/0010671 A1 | 1/2004 | Sampsa et al. | 711/165 |
| 2004/0221124 A1* | 11/2004 | Beckert et al. | 711/202 |
| 2005/0204113 A1 | 9/2005 | Harper et al. | |
| 2006/0075395 A1 | 4/2006 | Lee et al. | |
| 2006/0174056 A1 | 8/2006 | Lambert et al. | |
| 2006/0179212 A1 | 8/2006 | Kim et al. | |
| 2006/0184758 A1 | 8/2006 | Satori et al. | |
| 2006/0280077 A1 | 12/2006 | Suwa | |
| 2007/0088867 A1 | 4/2007 | Cho et al. | 710/22 |
| 2007/0283078 A1* | 12/2007 | Li et al. | 711/103 |
| 2008/0080688 A1 | 4/2008 | Burgan et al. | |
| 2008/0162792 A1* | 7/2008 | Wu et al. | 711/103 |
| 2008/0183954 A1 | 7/2008 | Lee et al. | |
| 2008/0228984 A1 | 9/2008 | Yu et al. | 710/308 |
| 2008/0244173 A1 | 10/2008 | Takai | |
| 2008/0282030 A1 | 11/2008 | Kalwitz et al. | |
| 2009/0182962 A1* | 7/2009 | Khmelnitsky et al. | 711/162 |
| 2009/0198871 A1 | 8/2009 | Tzeng | 711/103 |
| 2009/0216937 A1 | 8/2009 | Yasufuku | 711/103 |
| 2009/0313420 A1 | 12/2009 | Wiesz et al. | |
| 2009/0327584 A1* | 12/2009 | Tetrick et al. | 711/103 |
| 2010/0106886 A1* | 4/2010 | Marcu et al. | 711/102 |
| 2010/0106901 A1 | 4/2010 | Higeta et al. | |
| 2010/0169558 A1* | 7/2010 | Honda et al. | 711/103 |
| 2010/0169604 A1 | 7/2010 | Trika et al. | |
| 2010/0250836 A1 | 9/2010 | Sokolov et al. | |
| 2010/0293420 A1 | 11/2010 | Kapil et al. | 714/710 |
| 2010/0312947 A1 | 12/2010 | Luukkainen et al. | |
| 2011/0296088 A1 | 12/2011 | Duzly et al. | |
| 2012/0079171 A1 | 3/2012 | Ju et al. | |
| 2013/0007348 A1 | 1/2013 | Fai et al. | |
| 2013/0332691 A1 | 12/2013 | Hyvonen et al. | |

FOREIGN PATENT DOCUMENTS

| | | | |
|---|---|---|---|
| JP | 11143643 A | 5/1999 | |
| JP | 2000003309 A | 1/2000 | |
| JP | 2003015949 A | 1/2003 | |
| JP | 2006195569 A | 7/2006 | |
| JP | 2006221627 A | 8/2006 | |
| JP | 2007518166 A | 7/2007 | |
| KR | 20060082040 A | 7/2006 | |
| WO | WO2004084231 A1 | 9/2004 | |
| WO | WO2005088468 A2 | 6/2005 | |
| WO | WO2005066773 A1 | 7/2005 | |
| WO | WO2012021380 A2 | 2/2012 | |

OTHER PUBLICATIONS

"How to boot an embedded system from an eMMC™ equipped with a Microsoft FAT file system", Numonyx Application note AN2539, Nov. 2008, pp. 1-25.

"Embedded MultiMediaCard (eMMC) Mechanical Standard", JEDEC Standard, JESD84-C43, Jun. 2007, 14 pgs.
"Embedded MultiMediaCard (eMMC) Product Standard, High Capacity", JEDEC Standard, JESD84-A42, Jun. 2007, 29 pgs.
The Chinese Office Action mailed Dec. 19, 2013 for Chinese patent application No. 200980106241.1, a counterpart foreign application of US patent No. 8,307,180, 3 pages.
The Chinese Office Action mailed Apr. 9, 2013 for Chinese patent application No. 200980106241.1, a counterpart foreign application of US patent No. 8,307,180, 4 pages.
European Search Report for Application No. 09715221.9, dated Oct. 25, 2011, 30 pages.
Translated copy of the Japanese Office Action mailed Jan. 16, 2013 for Japanese patent application No. 2010548134, a counterpart foreign application of US patent No. 8,307,180, 6 pages.
Translated copy of the Japanese Office Action mailed Nov. 25, 2013 for Japanese patent application No. 2013-103695, a counterpart foreign application of US patent No. 8,307,180, 8 pages.
The Japanese Office Action mailed Aug. 27, 2013 for Japanese patent application No. 2010548134, a counterpart foreign application of US patent application No. 8,307,180, 4 pages.
Japanese Search Report for Application No. 2010-548134, mailed on May 10, 2012, 11 pages.
English translation of Office Action for Korean Patent Application No. 10-2010-7021534, dated Sep. 30, 2011, 2 pages.
Office Action for Korean Patent Application No. 10-2010-7021534, mailed on Sep. 30, 2011, 3 pages.
Office Action for U.S. Appl. No. 13/951,169, mailed on Oct. 8, 2013, Hyvonen, "Extended Utilization Area for a Memory Device," 9 pages.
International Search Report for PCT Application No. PCT/FI2009/050083 dated Jun. 3, 2009, pages.
Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.
Translation of Communication from Foreign Patent Office, Decision of Rejection, JP Application No. 2010-548134, mailed Jan. 16, 2013, 3 pages.
U.S. Appl. No. 13/358,806, filed Jan. 26, 2012, Mylly et al., "Apparatus and Method to Provide Cache Move with Non-Volatile Mass Memory System," 45 pages.
Translated copy of the Korean Office Action mailed Mar. 3, 2014 for Korean patent application No. 2013-7002338, a counterpart foreign application of US patent No. 8,307,180, 5 pages.
Office Action for U.S. Appl. No. 13/451,951, mailed on Jan. 7, 2014, Kimmo J. Mylly, "Managing Operational State Data in Memory Module," 24 pages.
Final Office Action for U.S. Appl. No. 13/951,169, mailed on Mar. 27, 2014, Jani Hyvonen, "Extended Utilization Area for a Memory Device," 10 pages.
The PCT Search Report and Written Opinion mailed Sep. 5, 2013 for PCT application No. PCT/US13/37298, 9 pages.

* cited by examiner

FIG.1A

PRIOR ART

APPARATUS AND METHOD TO SHARE HOST SYSTEM RAM WITH MASS STORAGE MEMORY RAM

TECHNICAL FIELD

The exemplary and non-limiting embodiments of this invention relate generally to memory storage systems, methods, devices and computer programs and, more specifically, relate to mass memory devices, such as those containing non-volatile flash memory.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
 CPU central processing unit
 eMMC embedded multimedia card
 exFAT extended file allocation table
 LBA logical block address
 MMC multimedia card
 RAM random access memory
 SCSI small computer system interface
 SD secure digital
 SW software
 UFS universal flash storage Various types of flash-based mass storage memories currently exist. A basic premise of mass storage memory is to hide the flash technology complexity from the host system. A technology such as eMMC is one example.

Figure 1A:
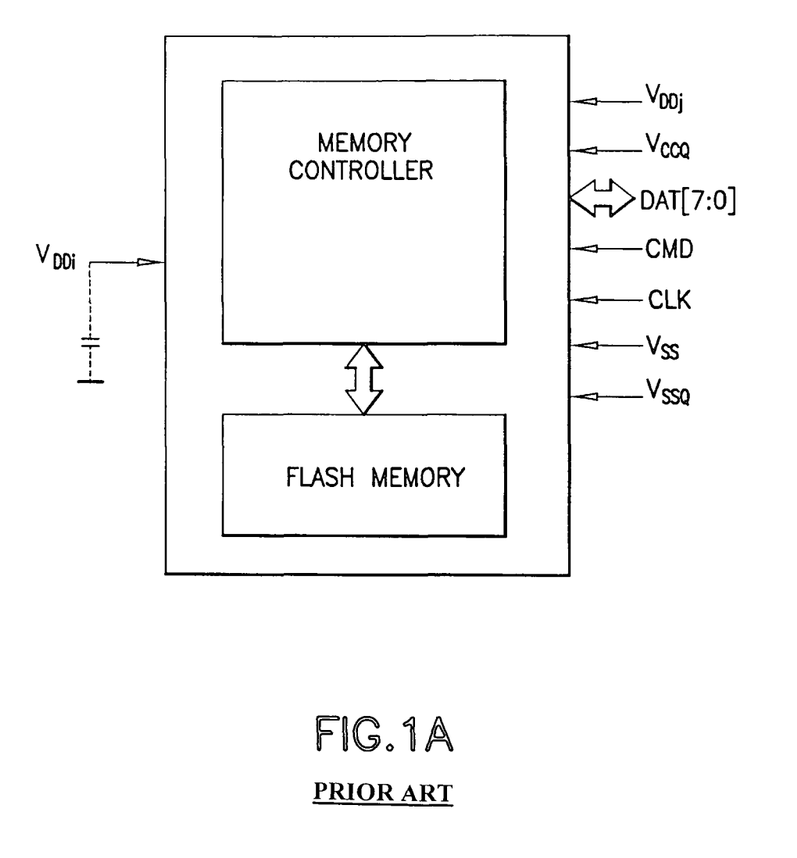
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4-bit mode) or DAT[7:0] (8-bit mode).

Figure 1B:
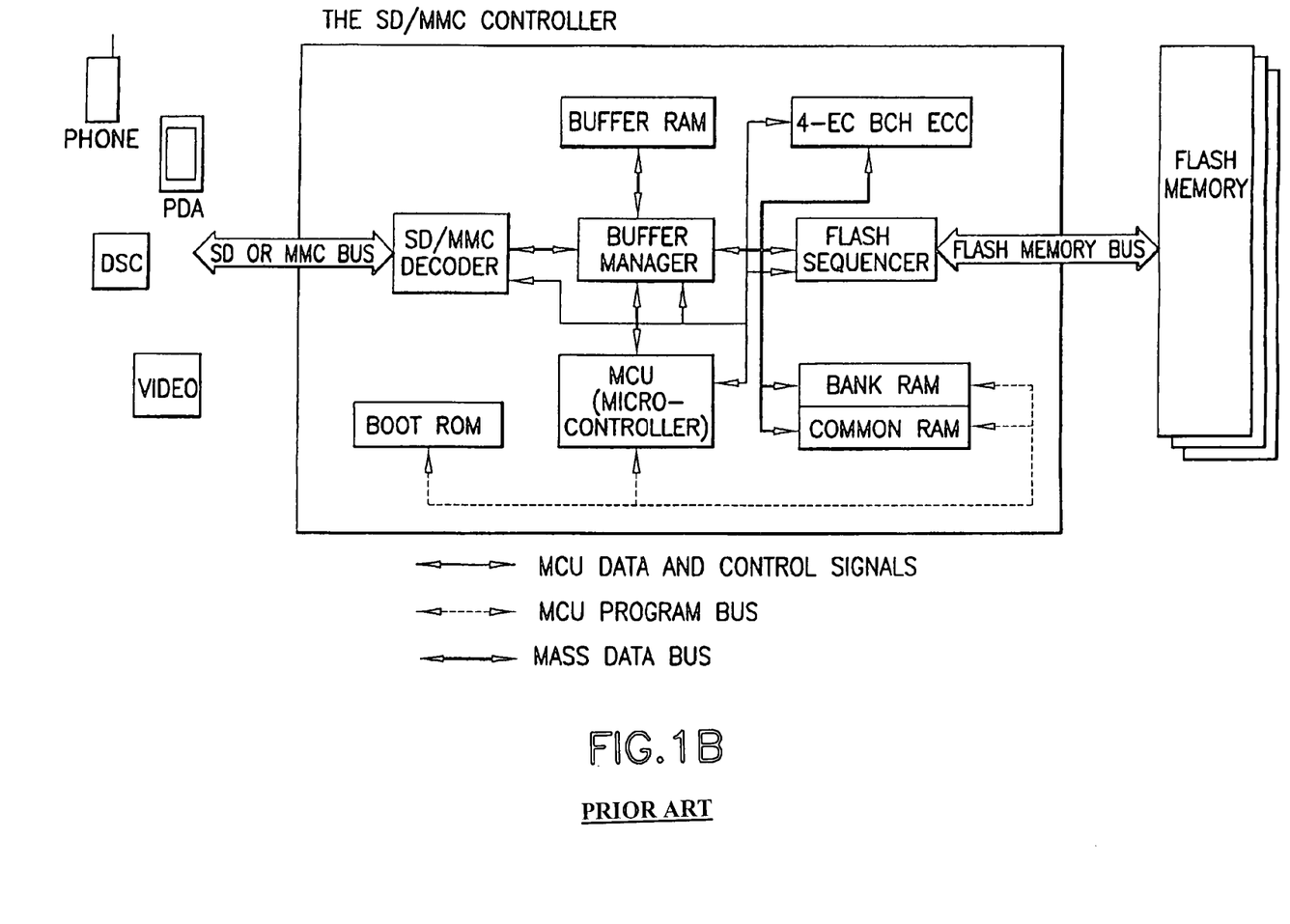
FIG. 1B reproduces FIG. 1 of Lin et al., and shows an example of an overall block diagram of a NAND flash controller architecture for a SD/MMC card.

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.) FIG. 1B reproduces FIG. 1 of Lin et al., and shows an overall block diagram of the NAND flash controller architecture for a SD/MMC card. The particular controller illustrated happens to use a w-bit parallel Bose-Chaudhuri-Hocquengham (BCH) error-correction code (ECC) designed to correct random bit errors of the flash memory, in conjunction with a code-banking mechanism. Of particular interest herein are the various RAM memories (e.g., buffer RAM, bank RAM, common RAM) that form part of the controller architecture.

Reference may also be made to US Patent Application Publication 2008/0228984, Sep. 18, 2008, "Single-Chip Multi-Media Card/Secure Digital (MCC/SD) Controller Reading Power-On Boot Code from Integrated Flash Memory for User Storage", I-Kang Yu et al. This publication describes another example of a flash controller where a Multi-Media Card/Secure Digital (MMC/SD) single-chip flash device contains a MMC/SD flash microcontroller and flash mass storage blocks containing flash memory arrays that are block-addressable rather than randomly-addressable. MMC/SD transactions from a host MMC/SD bus are read by a bus transceiver on the MMC/SD flash microcontroller. Various routines that execute on a CPU in the MMC/SD flash microcontroller are activated in response to commands in the MMC/SD transactions. A flash-memory controller in the MMC/SD flash microcontroller transfers data from the bus transceiver to the flash mass storage blocks for storage. Rather than booting from an internal ROM coupled to the CPU, a boot loader is transferred by direct memory access (DMA) from the first page of the flash mass storage block to an internal RAM. The flash memory is automatically read from the first page at power-on. The CPU then executes the boot loader from the internal RAM to load the control program. This approach is said to enable the microcontroller ROM to be eliminated or minimized.

Also of potential interest is an application note AN2539 "How to boot an embedded system from an eMMC™ equipped with a Microsoft FAT file system", Numonyx B. V., November 2008. This application note in Appendix A provides an overview of eMMC, and in Appendix B provides an overview of FAT.

SUMMARY

In a first aspect thereof the exemplary embodiments of this invention provide a method that comprises, in response to an allocation of read/write memory in a host device for use by a mass memory storage device, writing data from the mass memory storage device to the allocated read/write memory of the host device; and subsequently reading the data from the allocated memory to the mass memory storage device.

In another aspect thereof the exemplary embodiments of this invention provide an apparatus that comprises a controller; a volatile memory that is readable and writable by the controller; a non-volatile memory that is readable and writable by the controller; and an interface for connecting the apparatus to a host device. The controller is configurable to respond to an allocation of read/write memory in the host device to write data to the allocated memory of the host device, and to subsequently read the data from the allocated memory.

In another aspect thereof the exemplary embodiments of this invention provide a method that comprises allocating read/write memory in a host device for use by a mass memory storage device; receiving data from the mass memory storage device and writing the received data into the allocated read/write memory of the host device; and subsequently sending the data from the allocated memory to the mass memory storage device.

In a still further aspect thereof the exemplary embodiments of this invention provide an apparatus that comprises a controller; a memory that is readable and writable by the controller; and an interface for connecting the apparatus to a mass storage memory device. The controller is configurable to allocate a portion of the memory for use by the mass storage memory device. The controller is further configurable to receive data from the mass storage memory device and to store the received data in the allocated portion of the memory, and to subsequently send the data from the allocated portion of the memory to the mass storage memory device.

DETAILED DESCRIPTION

At present, most mass storage memories provide LBA-based access, e.g., eMMC and different types of external memory cards such as SD. However, it may also be the case that the entire file system (FS) SW is embedded in the mass storage memory device.

When a mass storage memory is used in a high volume consumer device, such as a mobile wireless communication device, one important consideration is cost, and one factor affecting the cost is the amount of RAM in the mass storage memory device itself.

Another important consideration is performance. The overall performance depends on many factors. For example, for lengthy (time consuming) operations (in particular if the mass storage memory device contains an entire file system SW) there would be an advantage to include a substantial amount of RAM in the mass storage memory device. However, this can have a negative impact on the cost.

It may be the case that system context (metadata) would be stored in the flash memory of the mass storage memory device. However, this approach has several associated disadvantages. For example, repeatedly writing the system context (metadata) to the mass storage memory device raises wearing issues that can impact the usable life of the mass storage memory device. Also, writing data to the flash memory can be a relatively slow process.

Another important consideration is the power efficiency. To provide good power efficiency the mass storage memories are preferably shutdown (powered-off) when not needed (meaning also that the internal RAM of the device is preferably shutdown as well). However, and assuming that the RAM is volatile in nature, then whatever data is stored in the RAM is lost when the power is removed from the RAM. To then perform re-initialization after power-up all needed information (e.g., logical-to-physical mapping information and/or file system structures) need to be restored. A full re-initialization of a LBA mass storage memory may require a substantial (and user-noticeable) amount of time (e.g., up to one second with an SD card), and entire file system initialization (if the file system is resident in the mass storage memory) may take even longer. Therefore, it is desirable to retain internal device context over the power-off/power-on cycle.

Figure 2:
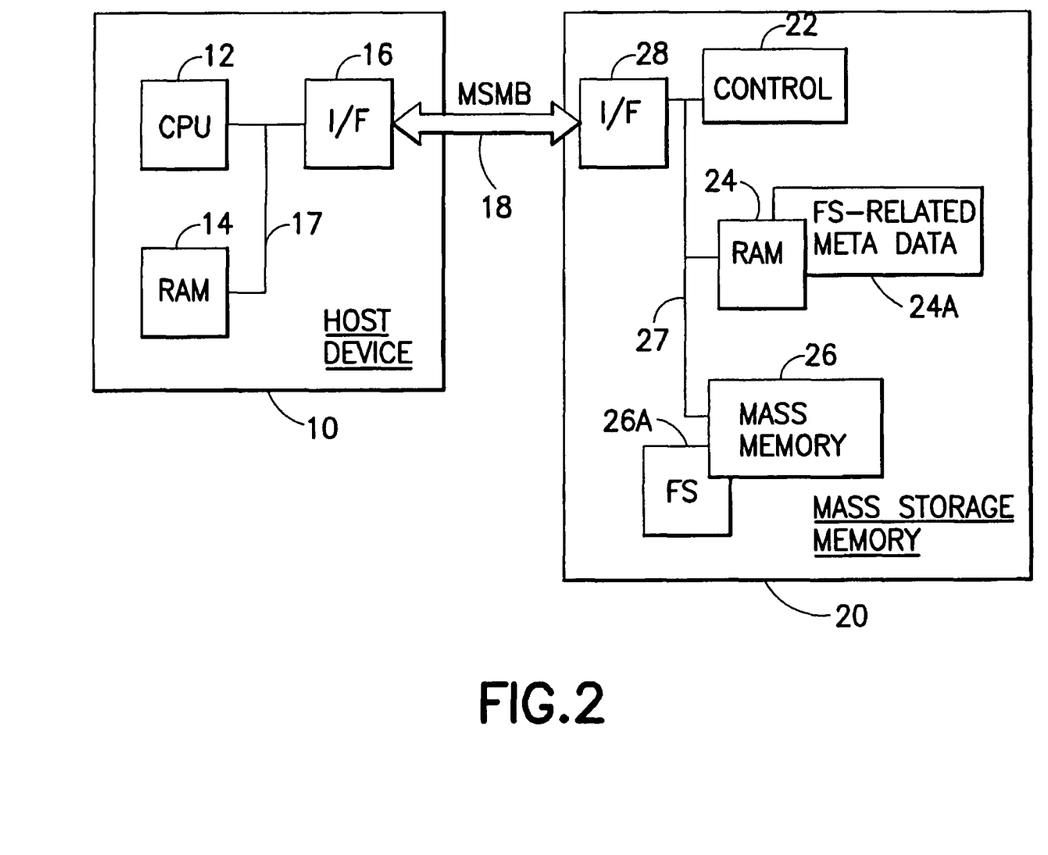
FIG. 2 is a simplified block diagram of a host device connected with a mass storage memory device, and is helpful in describing the exemplary embodiments of this invention.

Before further describing the exemplary embodiments of this invention, reference is made to FIG. 2 which shows is a simplified block diagram of a host system or device 10 connected with a mass storage memory 20 via a mass storage memory bus (MSMB) 18. The MSMB 18 may be compatible with any suitable mass memory interface standard such as MMC or UFS, as two non-limiting examples. The MSMB 18 may include signal lines such as those shown in FIG. 1A for an eMMC embodiment. The host device 10 includes at least one controller, such as a CPU 12 that operates in accordance with stored program instructions. The program instructions maybe stored in a RAM 14 or in another memory or memories. The CPU 12 is connected with the RAM 14 and a MSMB interface (I/F) 16 via at least one internal bus 17. The MSMB interface 16 may include a memory controller (MC), or maybe coupled with a MC unit associated with the CPU 12. The host device 10 may be a computer, a cellular phone, a digital camera, a gaming device or a PDA, as several non-limiting examples. Note that the RAM 14 may be any read/write memory or memory device, such as semiconductor memory or a disk-based memory.

The mass storage memory 20 includes a microcontroller or, more simply, a controller 22 that is connected via at least one internal bus 27 with a volatile RAM 24, a non-volatile mass memory 26 (e.g., a multi-gigabyte flash memory mass storage) and a MSMB interface (I/F) 28. The controller 22 operates in accordance with stored program instructions. The program instructions may be stored in the RAM 24 or in a ROM or in the mass memory 26. The mass storage memory 20 may be embodied as an MMC, eMMC or a SD device, as non-limiting examples, and may be external to (plugged into) the host device 10 or installed within the host device 10. Note that the mass memory 26 may, in some embodiments, store a file system (FS) 26A. In this case then the RAM 24 may store FS-related metadata 24A, such as one or more data structures comprised of bit maps, file allocation table data and/or other FS-associated information.

The exemplary embodiments of this invention provide a technique to share the RAM 14 of the host device 10 with the mass storage memory device 20. It may be assumed that the host device 10 (e.g., a mobile computer, a cellular phone, a digital camera, a gaming device, a PDA, etc.) has the capability to allocate and de-allocate the RAM 14. As will be discussed in further detail below, the allocation of the RAM 14 may be performed dynamically or it may be performed statically. The allocation of a portion of the RAM may be performed in response to a request received at the host device 10, or at the initiative of the host device 10.

In the exemplary embodiments of this invention the RAM 14 allocation is provided for the mass storage memory 20 (connected via the MSMB 18 to the host CPU 12), if the mass storage memory 20 has a need to extend its own RAM 24 space and/or if the mass storage memory 20 has a need for non-volatile RAM (the contents of which are not lost when the mass storage memory 20 is powered-off). It is also within the scope of the exemplary embodiments of this invention for the mass storage memory 20 to read and/or write (R/W) allocated RAM 14 in the host device 10. The allocation/de-allocation and R/W access methods may be implemented by extensions to a command set used to communicate with the mass storage memory 20 via an applicable mass storage memory protocol.

Figure 3:
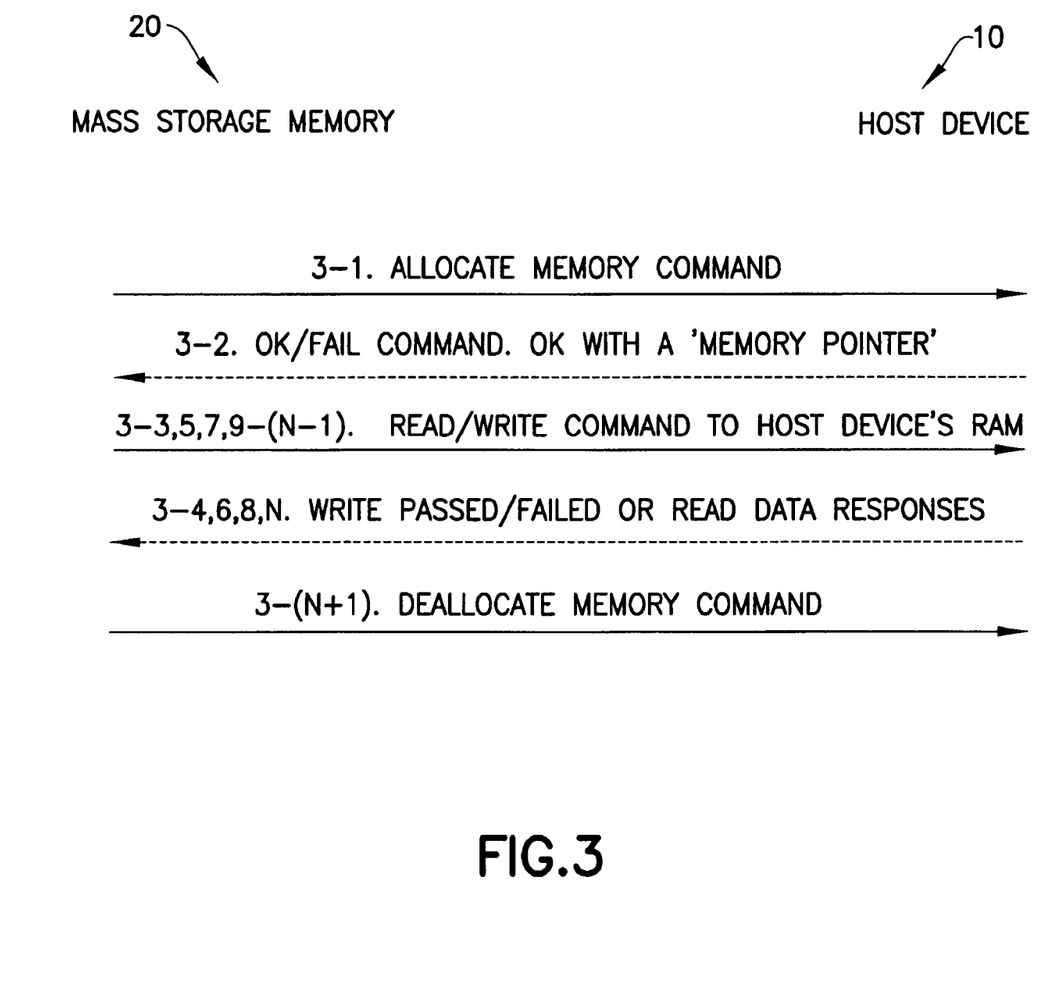
FIG. 3 is a signal/message flow diagram that describes an exemplary embodiment of this invention for the mass storage memory device of FIG. 2 to allocate, use and de-allocate RAM of the host device.

In accordance with certain exemplary embodiments of this invention the mass storage memory device 20 is provided with a mechanism to interrupt/send a message to host device 10 to initiate an allocation of space in the RAM 14. The interrupt/message is sent over the MSMB 18, and may be considered as an extension to current command sets. Referring to FIG. 3, an allocate memory command is sent during operation 3-1. If the allocation request succeeds (indicated during operation 3-2) the controller 22 is enabled to extend its own RAM 24 with the RAM 14 of the host device 10. The mass storage memory device 20 may store, for example, large tables into the RAM 14 using a RAM WRITE command (a newly specified command), or it may fetch data from the host device RAM 14 using a RAM READ command (another newly specified command). The read or write operation is shown as interleaved operations 3-3, 3-4, 3-5, 3-6, . . . , 3-(N−1), 3-N. When the mass storage memory device 20 completes the operation with the RAM 14 it may free the host device RAM 14 using another newly specified command that requests that the host 10 RAM memory be de-allocated (operation 3-(N+1)).

Figure 4:
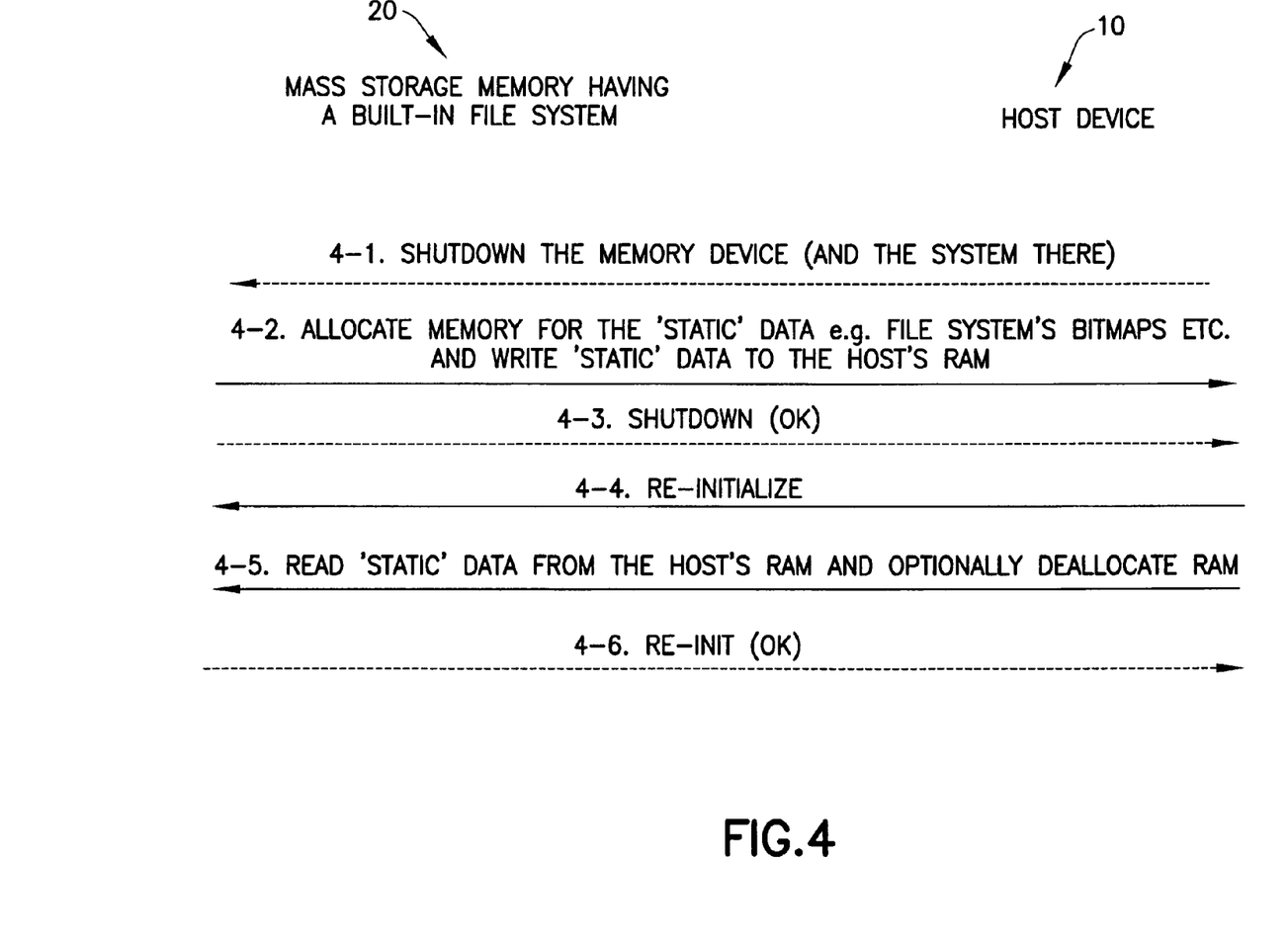
FIG. 4 is a signal/message flow diagram that describes another exemplary embodiment of this invention, where the mass storage memory device of FIG. 2 has a built-in file system.

FIG. 4 illustrates a further exemplary embodiment that utilizes the host system RAM 14 for the mass storage memory 26 having a built-in file system, such as the FS 26A shown in FIG. 2. First the host system 10 sends a SHUTDOWN command to the mass storage memory device 20 (operation 4-1). Next the mass storage memory device 20 allocates RAM 14 from the host 10 and then loads (stores using a RAM WRITE command) all vital 'static' file system-related data (meta-data 24A) into host RAM 14 (operation 4-2). 'Static' data in this context may be, for example, various bitmaps, such as an allocation bitmap in the exFAT or ext3 file systems. This data may be processed (e.g., at least one of sorted, arranged and filtered) by the CPU 12 (controller) of the host device, and may include data from a large number of sectors in the mass storage memory 26. Mass memory storage device 20 may then send a shutdown OK indication (operation 4-3). The host 10 can remove power from the mass memory storage device 20, and the device 20 maybe physically removed from the MSMB 18. Re-initialization (operations 4-4, 4-5, 4-6) of the mass storage memory device 20 is performed when host device 10 needs to get/put certain data from or into the mass storage memory device 20. Re-initialization of the mass storage memory 26 (and the file system 26A) may be sped up by using the sorted/arranged/filtered read data from the RAM 14. When the re-initialization operation is completed the mass storage memory device 20 may de-allocate the used RAM 14 in the host device 10, or the RAM 14 may not be de-allocated thereby reserving the RAM space for future use by the mass storage memory device 20.

It should be noted that in other exemplary embodiments of this invention the allocation of host RAM 14 may occur differently. For example, the host device 10 may allocate RAM 14 dynamically and pass a 'pointer' to the allocated RAM to the mass storage memory device 20. It is then up to the controller 22 of the mass storage memory device 20 how to utilize the allocated host RAM 14. Note that in this embodiment an explicit allocation request from the mass storage memory device 20 may not be sent to the host device 10. Instead, the host device 10 may on its own initiative allocate a portion of the RAM 14, such as when it first detects the presence of the mass memory storage device 20. Of course, subsequent signaling between the mass storage memory device 20 and the host device 10 may be used to change the size of the allocated RAM 14 if the initial allocation is not sufficient for the needs of the controller 22. As another example of RAM 14 allocation, a portion of the RAM 14 may be allocated by the host 10 in a static manner, and the mass storage memory device 20 then simply uses the same portion of the RAM 14 each time it needs to extend the RAM 24. In this case the mass storage memory device 20 may already have knowledge of the location/size of the allocated RAM 14, and a pointer is not needed to be sent from the host device 10.

Note that while it may typically be the case that the mass storage memory device 20 will receive an allocation of host memory to store contents of the volatile RAM 24, in general the allocation may be for storing data for any read/write memory contained within the mass storage memory device 20.

Figure 5:
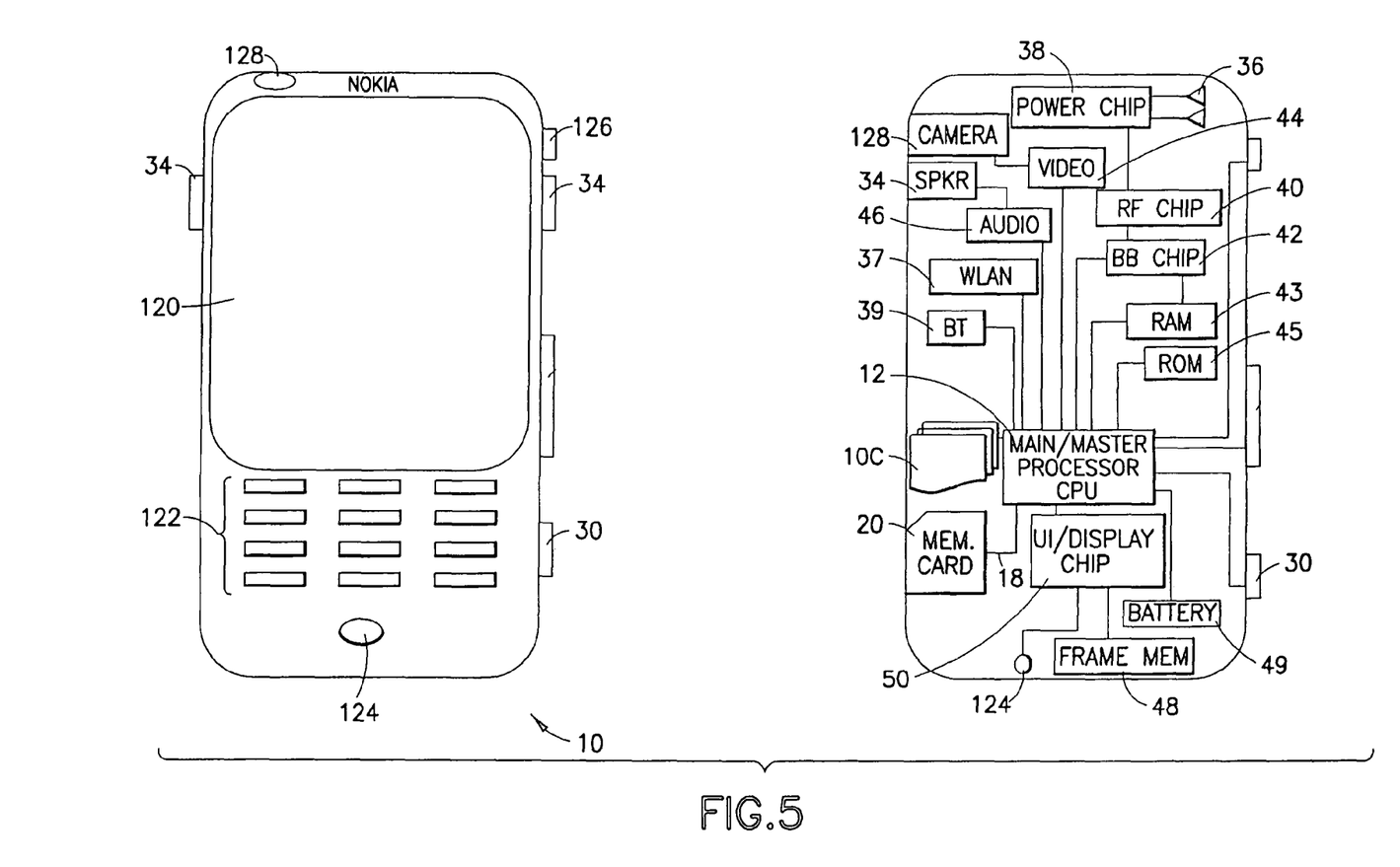
FIG. 5 shows a block diagram of one exemplary embodiment of the host device when embodied as a wireless communication device.

FIG. 5 illustrates one non-limiting embodiment of the host device 10 used with the mass storage memory device 20, referred to in FIG. 5 simply as a memory card. In this exemplary embodiment the host device is embodied as a user equipment (UE), shown in both plan view (left) and sectional view (right). In FIG. 5 the UE 10 has a graphical display interface 120 and a user interface 122 illustrated as a keypad but understood as also encompassing touch screen technology at the graphical display interface 120 and voice recognition technology received at the microphone 124. A power actuator 126 controls the device being turned on and off by the user. The exemplary UE 10 may have a camera 128 which is shown as being forward facing (e.g., for video calls) but may alternatively or additionally be rearward facing (e.g., for capturing images and video for local storage). The camera 128 is controlled by a shutter actuator 30 and optionally by a zoom actuator which may alternatively function as a volume adjustment for the speaker(s) 34 when the camera 128 is not in an active mode.

Within the sectional view of FIG. 5 are seen multiple transmit/receive antennas 36 that are typically used for cellular communication. The antennas 36 maybe multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to a radio frequency (RF) chip 40 which demodulates and downconverts the signal for baseband processing. A baseband (BB) chip 42 detects the signal which is then converted to a bit stream and finally decoded. Similar processing occurs in reverse for signals generated in the host device 10 and transmitted from it.

Signals going to and from the camera 128 may pass through an image/video processor 44 that encodes and decodes the various image frames. A separate audio processor 46 may also be present controlling signals to and from the speakers 34 and the microphone 124. The graphical display interface 120 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on the chip or be coupled to an antenna off the chip. Throughout the apparatus are various memories such as random access memory RAM 43, read only memory ROM 45, and in some embodiments removable memory such as the illustrated memory card 20 on which various programs 10C maybe stored. All of these components within the UE 10 are normally powered by a portable power supply such as a battery 49.

The processors 38, 40, 42, 44, 46, 50, if embodied as separate entities in a UE 10, may operate in a slave relationship to the main processor (CPU) 12, which may then be in a master relationship to them. Certain embodiments may be disposed across various chips and memories as shown, or disposed within another processor that combines some of the functions described above for FIG. 5. Any or all of these various processors of FIG. 5 access one or more of the various memories, which may be on chip with the processor or separate from the chip with the processor. Note that the various integrated circuits (e.g., chips 38, 40,42, etc.) that were described above may be combined into a fewer number than described and, in a most compact case, may all be embodied physically within a single chip.

In this exemplary embodiment the CPU 12 of the UE 10 (the host device) operates with the memory card 20 (the mass storage memory device) as described above with respect to FIGS. 3 and 4 so that the RAM 24 of the memory card 20 may be extended to use the RAM 14 of the UE 10.

There are a number of technical effects that may be realized by the use of the exemplary embodiments of the invention. For example, there is provided a cost efficient way to extend RAM in the mass storage memory device 20. Further by example, the mass storage memory device 20 may be powered off, while retaining mass storage memory device information on the RAM 14 of the host system.

Based on the foregoing it should be apparent that the exemplary embodiments of this invention provide a method, apparatus and computer program(s) to extend the RAM of a mass storage memory device to include the RAM of an attached host device.

Figure 6:
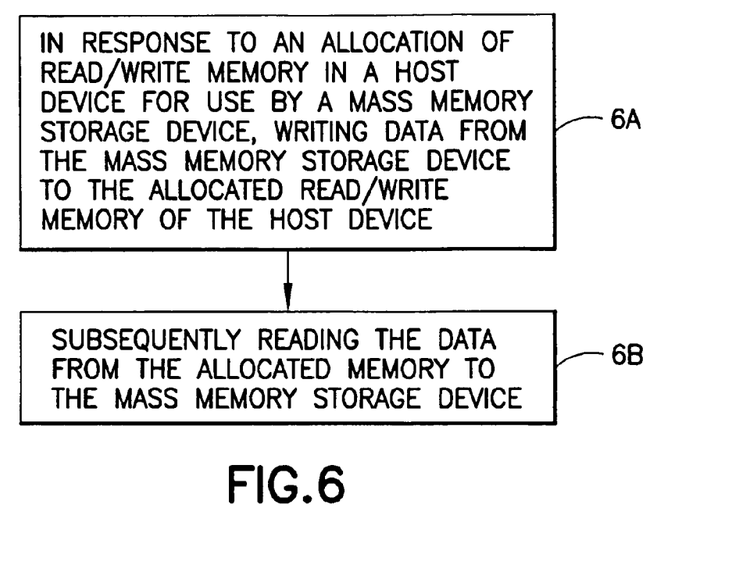
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, in response to an allocation of read/write memory in a host device for use by a mass memory storage device, writing data from the mass memory storage device to the allocated read/write memory of the host device. At Block 6B there is an operation of subsequently reading the data from the allocated memory to the mass memory storage device.

Figure 7:
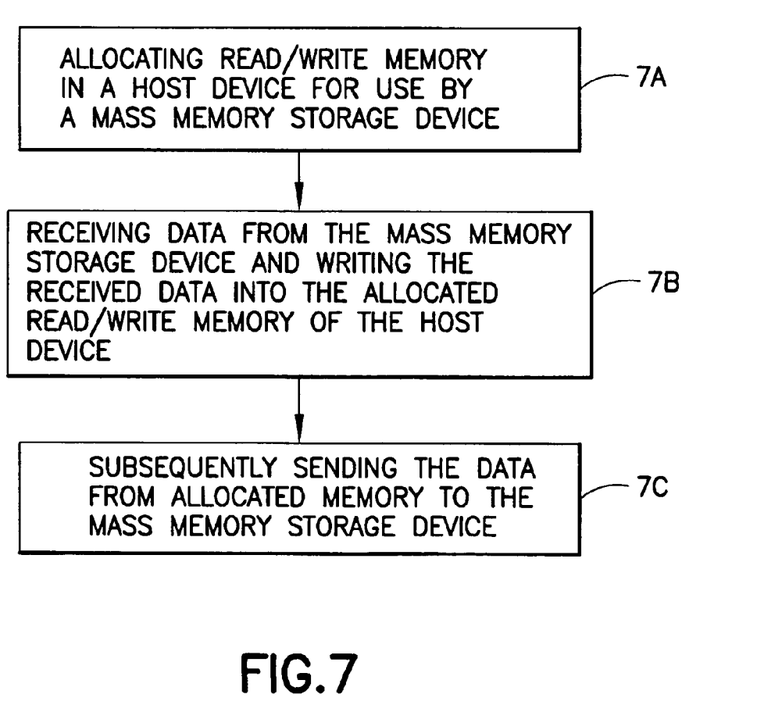
FIG. 7 is a logic flow diagram that illustrates the operation of a method, and a result of execution of computer program instructions embodied on a computer readable memory, further in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, an operation of allocating read/write memory in a host device for use by a mass memory storage device. At Block 7B there is an operation of receiving data from the mass memory storage device and writing the received data into the allocated read/write memory of the host device. At Block 7C there is an operation of subsequently sending the data from the allocated memory to the mass memory storage device.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention maybe realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving, at a memory storage device, an allocation of read/write memory in the host device for use by the memory storage device;
   creating, in response to the allocation of the read/write memory in the host device for use by the memory storage device, an extended random access memory including a random access memory of the memory storage device and the allocated read/write memory of the host device, the memory storage device including non-volatile memory;
   writing data to the extended random access memory; and
   subsequently reading the data from the extended random access memory.

2. The method of claim 1, where the data comprises meta-data associated with a file system stored in the non-volatile memory of the memory storage device.

3. The method of claim 1, where writing data is followed by removing power from the random access memory of the memory storage device.

4. The method of claim 1, further comprising sending from the memory storage device to the host device, a request to de-allocate the read/write memory in the host device.

5. The method of claim 1, further comprising requesting the host device to perform the allocation.

6. The method of claim 1, wherein the allocation was initiated by the host device.

7. The method of claim 1, wherein the allocation was initiated by the host device in response to the host device detecting the presence of the memory storage device.

8. The method of claim 1, further comprising after writing or reading the data, sending a request to the host device to deallocate the read/write memory.

9. The method of claim 1, wherein receiving, at the memory storage device, the allocation of the read/write memory comprises:
   receiving a command indicating the allocation of the read/write memory.

10. The method of claim 9, wherein the command comprises a pointer to the allocated read/write memory.

11. A memory storage device, comprising:
    a controller;
    a random access memory that is readable and writable by the controller;
    a non-volatile memory that is readable and writable by the controller; and
    an interface for connecting the memory storage device to a host device;
    the controller operable to:
      in response to receiving, from the host device, an allocation of read/write memory in the host device for use by the memory storage device, create an extended random access memory including a random access memory of the memory storage device and the allocated read/write memory of the host device;
      write data to the extended random access memory; and
      subsequently read the data from the extended random access memory.

12. The memory storage device of claim 11, wherein the data comprises meta-data associated with a file system stored in the non-volatile memory of the memory storage device.

13. The memory storage device of claim 11, wherein writing data is followed by removing power from the random access memory of the memory storage device, and where the allocation is made in response to a request sent from the controller to the host device via the interface.

14. The memory storage device of claim 11, the controller further operable to send to the host device a request to deallocate the read/write memory in the host device.

15. The memory storage device of claim 11, wherein the non-volatile memory comprises flash memory.

16. The apparatus of claim 11, wherein the controller is operable to request the host device to perform the allocation.

17. The apparatus of claim 11, wherein the allocation was initiated by the host device.

18. The apparatus of claim 11, wherein the allocation was initiated by the host device in response to the host device detecting the presence of the memory storage device.

19. The apparatus of claim 11, wherein after writing or reading the data, the controller is operable to request the host device to deallocate the read/write memory.

20. The memory storage device of claim 11, wherein receiving, from the host device, the allocation of the read/write memory comprises:
    receiving a command indicating the allocation of the read/write memory.

21. The memory storage device of claim 11 wherein receiving, from the host device, the allocation of the read/write memory comprises:
    receiving a pointer to the allocated read/write memory.

22. A method, comprising:
    allocating read/write memory in a host device for use by a memory storage device, the memory storage device comprising non-volatile memory;
    receiving from a host device an allocation of read/write memory in the host device for use by the memory storage device;
    creating an extended random access memory comprising a random access memory of the memory storage device and the allocated read/write memory of the host device;
    writing data to the extended random access memory; and
    reading data from the extended random access memory.

23. The method of claim 22, wherein the data comprises meta-data associated with a file system stored in the non-volatile memory of the memory storage device.

24. The method of claim 22, further comprising processing the data in the host device.

25. The method of claim 24, wherein processing the data comprises sorting, arranging, or filtering of the data.

26. The method of claim 22, further comprising receiving a request from the memory storage device to deallocate the allocated read/write memory.

27. The method of claim 22, further comprising receiving a request from the memory storage device to perform the allocation.

28. The method of claim 22, wherein the allocation was initiated by the host device.

29. The method of claim 22, wherein the allocation was initiated by the host device in response to the host device detecting the presence of the memory storage device.

30. The method of claim 22, further comprising, after writing or reading the data, receiving a request from the memory storage device to deallocate the read/write memory.

31. A system comprising:
    a host device controller of a host device;
    a host memory of the host device that is readable and writable by the host device controller; and
    an interface for connecting the host device to a memory storage device that comprises non-volatile memory;
    the host device controller operable to allocate at least a portion of the host memory for use by the memory storage device;

a memory controller of the memory storage device, the memory controller operable to:
  create an extended random access memory comprising a random access memory of the memory storage device and the allocated portion of the memory of the host memory;
  write data to the extended random access memory; and
  read data from the extended random access memory.

32. The system of claim 31, wherein the data comprises meta-data associated with a file system stored in the non-volatile memory of the memory storage device.

33. The system of claim 31, further comprising a host processor for processing the data received from the memory storage device before sending the data from the allocated portion of the host memory to the memory storage device.

34. The system of claim 33, wherein the host processor, when processing the data, performs sorting, arranging, or filtering of the data.

35. The system as in claim 31, wherein the host device controller is further operable to send a shutdown command to the storage memory device and to at least partially remove power from the storage memory device after receiving the data.

36. The system of claim 31, wherein the non-volatile memory comprises flash memory.

37. The system of claim 31, wherein the host controller is operable to receive a request from the memory storage device to perform the allocation.

38. The system of claim 31, wherein the allocation was initiated by the host device.

39. The system of claim 31, wherein the allocation was initiated by the host device in response to the host device detecting the presence of the memory storage device.

* * * * *